Aug. 12, 1924. 1,504,855
F. BECKER
LABELING MACHINE
Filed May 17, 1922 6 Sheets-Sheet 2

Fig. 2.

INVENTOR
Fritz Becker
BY C. P. Goepel
ATTORNEY

F. BECKER

LABELING MACHINE

Filed May 17, 1922          6 Sheets-Sheet 5

1,504,855

INVENTOR
Fritz Becker
BY C. P. Goebel
ATTORNEY

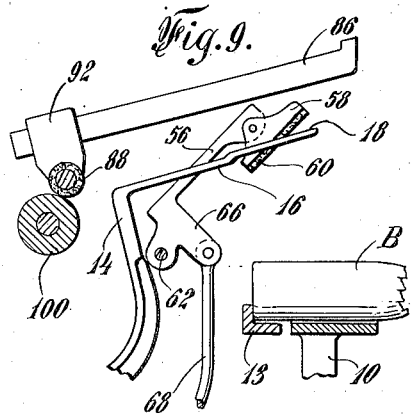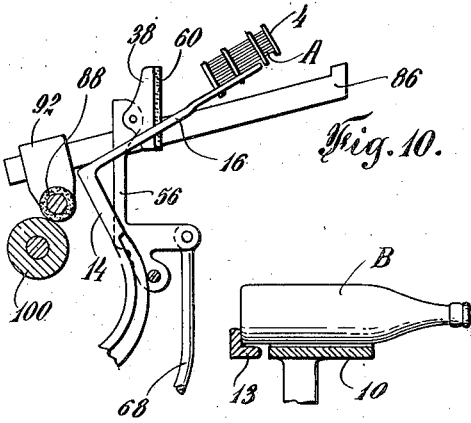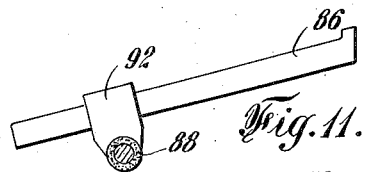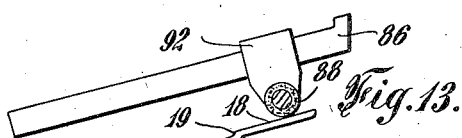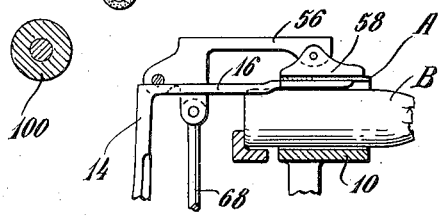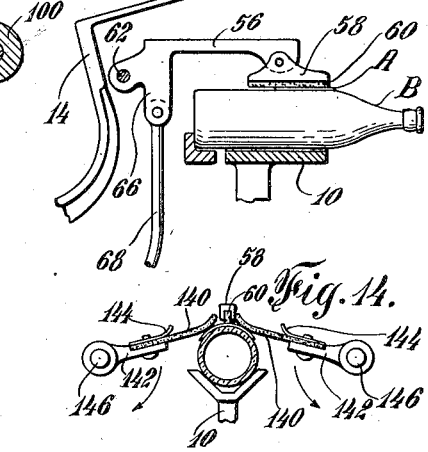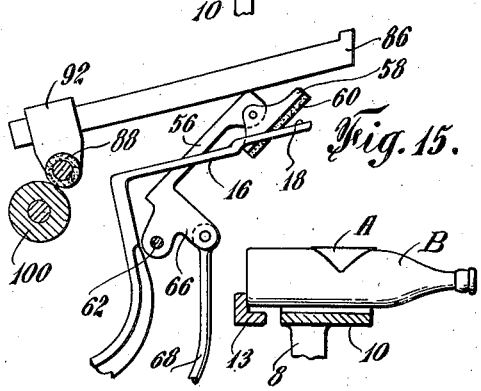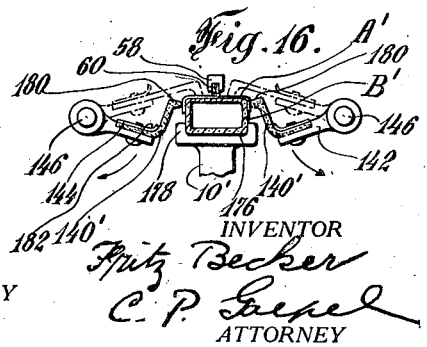

Patented Aug. 12, 1924.

1,504,855

UNITED STATES PATENT OFFICE.

FRITZ BECKER, OF LONG ISLAND CITY, NEW YORK, ASSIGNOR TO NATIONAL LABELING MACHINE COMPANY.

LABELING MACHINE.

Application filed May 17, 1922. Serial No. 561,588.

*To all whom it may concern:*

Be it known that I, FRITZ BECKER, a citizen of the United States, and resident of Long Island City, in the county of Queens and State of New York, have invented certain new and useful Improvements in Labeling Machines, of which the following is a specification.

This invention relates to labeling machines, and is particularly intended for use in affixing labels to bottles or other articles commonly used for trade purposes.

It is an object of the invention to provide a labeling machine with operating instrumentalities so constructed and arranged as to insure that the ends of the labels will be closely and smoothly engaged upon the articles. To this end an important feature of the invention resides in the provision with means for locating a label upon an article to be labeled of wipers arranged to engage the label on opposite sides of the locating means and being rotated continuously in the same direction so as to insure that they will pass off from the tip ends of the labels and will have no return movement in which they might injuriously engage the ends of the labels. It has heretofore been customary, so far as applicant is aware, to employ oscillating wipers in labeling machines, and it sometimes happens that such wipers upon their return movements engage the tip ends of a label and loosen them from the article, or tear or otherwise disarrange them. The use of rotary wipers in accordance with the invention obviates all possibility that the wipers will engage the ends of a label, except in a direction such as to cause it to be pressed against the article.

Other features of the invention relate to the construction and arrangement of its several operating instrumentalities whereby the machine is rendered peculiarly efficient in use.

Still other objects and features of the invention will appear as the description proceeds and will be pointed out in the appended claims:

Fig. 2 is a view of the machine in front elevation;

Figure 3:
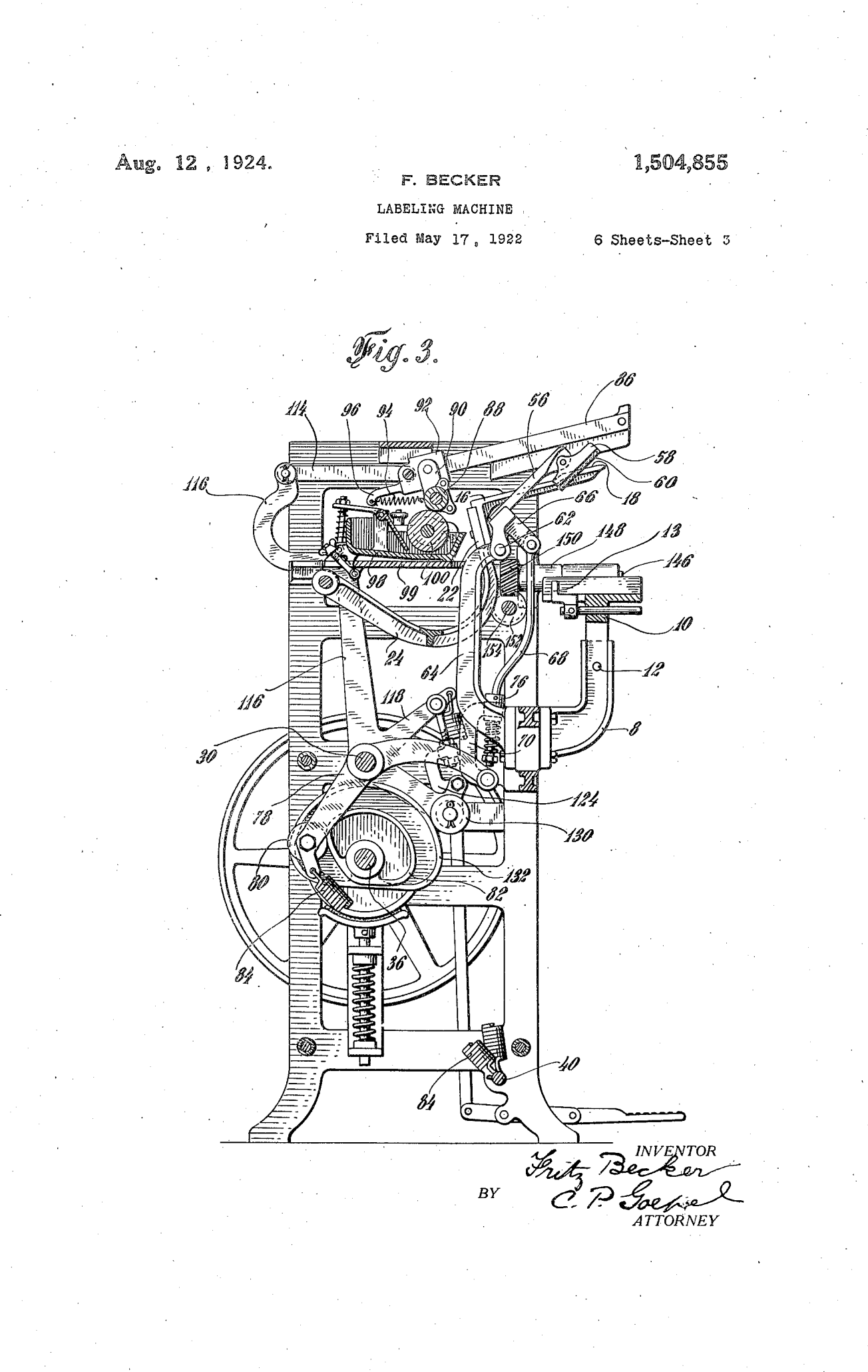

Fig. 3 is a view in sectional elevation taken substantially along the line 3—3 of Fig. 2;

Figs. 9, 10 and 11 illustrate the several operating instrumentalities of the machine in various positions;

Fig. 12 is a view of such parts in the positions which they occupy in Fig. 11 and looking from the right in Fig. 11.

Fig. 13 is a view similar to Figs. 9, 10 and 11, but showing the parts in still another position;

Fig. 14 is a view of the operating instrumentalities of the machine in the positions which they occupy in Fig. 13 and looking from the right in Fig. 13;

Fig. 15 is a view of the operating instrumentalities in the positions occupied by them upon the completion of a cycle of their operations, and Fig. 16 is a view similar to Fig. 14, but showing a modified construction.

The illustrated construction comprises a frame 2 at the top of which is mounted a label container 4 which contains a column of labels A. The container 4 and the means for mounting it upon the frame of the machine are well known and constitute in themselves no part of the present invention. A more complete disclosure thereof is accordingly considered unnecessary.

Figure 1:
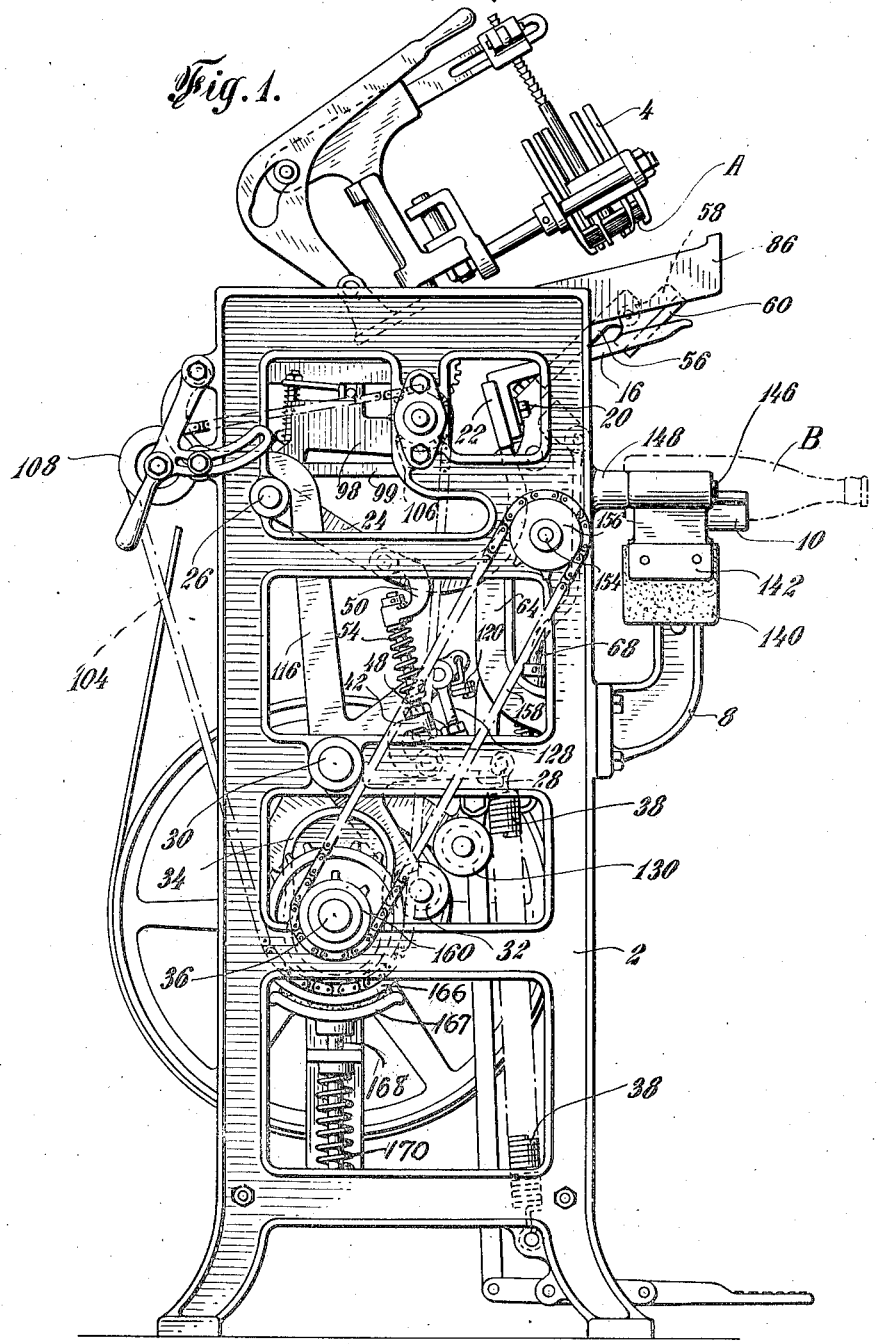
Fig. 1 is a view in elevation of a machine constructed in accordance with the invention, taken from the left-hand side of Fig. 2.

Mounted on the front side of the frame 2 is a bracket 8 to the upper end of which is secured an article support 10. The article support 10 may be of various forms in order to adapt the machine for affixing labels to articles and packages of varying sizes and shapes. As shown, the machine is intended for use in affixing labels to bottles of the character indicated at B in Fig. 1, and the article support 10 is accordingly constructed in the form of a substantially V-shaped trough, the bottles being positioned on the support 10 by means of a stop member 13 adjustably supported in the shank of the article support. The article support 10 is detachably secured to the bracket 8 by a screw or the like 12 in order to enable the support to be readily removed from the machine and replaced by one of a different size or form when it is desired to affix labels to articles of a character different from those which have been previously operated upon by the machine.

Figure 4:
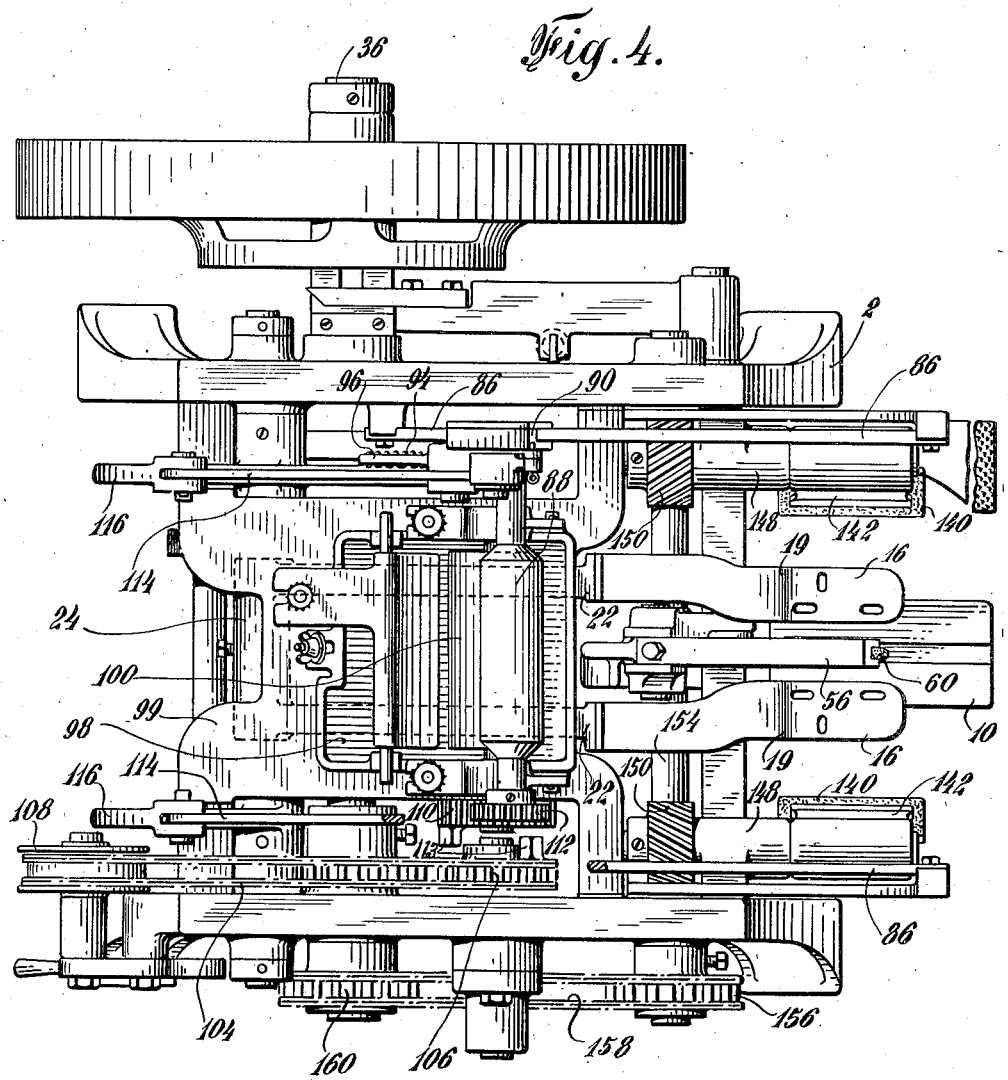
Fig. 4 is a plan view of the machine.

Means are provided for transferring labels successively from the container 4 to the articles positioned on the support 10. In the present embodiment of the invention, such means comprises a transferrer, designated generally by 14, and comprising spaced arms 16 the outer ends of which are movable between the lower end of the container 4 and a point adjacent to the article support. The arms 16 are further formed to present surfaces 18 on their upper sides adjacent to their outer ends arranged upon movement of the arms to their uppermost position to engage the under-surface of the lower label in the container 4 at its end portions. Preferably, and as shown, the outer ends of the arms 16 are provided with openings, arranged as indicated in Fig. 4, and are offset upwardly, as indicated at 19, at a point rearwardly of the surfaces 18 for a purpose which will appear more clearly hereinafter.

Figure 5:
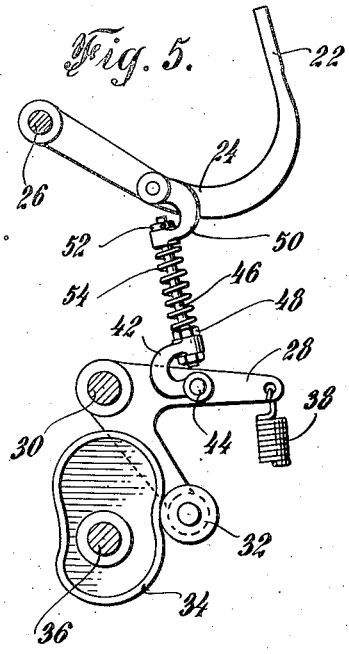
Fig. 5 is a view in side elevation of the means for operating the transferrer arms for the labels.

The arms 16 of the transferrer 14 are connected at their rear ends by suitable fastenings 20 to the upper ends 22 of a yoke lever 24 fulcrumed at 26 on the machine frame 2. The yoke lever 24 (Fig. 5) is operated from a lever 28 loosely mounted on a shaft 30 extending transversely on the machine frame and provided with a roller 32 arranged to ride on the periphery of a cam 34 fixed on the main cam shaft 36 of the machine. The roller 32 on the lever 28 is urged against the cam 34 by a spring 38 connected at one of its ends to the upper arm of the lever 28, and at its other end to a rod 40 mounted transversely in the frame 2. A small yoke 42 is pivoted at 44 to the upper arm of the lever 28, and has an eye at its upper end which receives the lower end of a rod 46 fixedly secured to the outer end of the yoke 42 by nuts 48. A second small yoke 50 is pivoted at its upper end to the yoke lever 24 and at its lower end is provided with an eye which loosely receives the upper end of the rod 46. The yoke 50 is normally held against a collar 52 fast to the upper end of the rod 46 by a compression spring 54 interposed between the yoke 50 and the upper nut 48. With this construction, the arms 16 are permitted to yield on their upward movement to adapt themselves to varying positions to the label container 4, and the position to which the labels A are carried in the downward movement of the arms 16, as well as the pressure of the arms 16 upon the labels in the container 4 at the end of the upward movement of the arms, may be adjusted by turning the nuts 48 upwardly or downwardly on the rod 46. The adjustment provided by the nuts 48, therefore, enables the machine to be adapted for affixing labels to articles of varying degrees of projection above the article support 10, and also enables the degree of pressure of the surfaces 18 of the arms against the labels in the container 4 to be regulated as desired.

The transferrer 14 in its downward movement carries the labels A to a point adjacent to the tops of the articles to which the labels are to be affixed, as clearly appears from Fig. 12, in which the arms 16 of the transferrer 14 are shown in their lowermost position. As also appears from Fig. 12, the arms 16 of the transferrer are located at opposite sides of the center line of the article support 10. After a label A has been brought to a point adjacent to the article B by the arms 16, the label is located against the article and maintained in such position by means now to be described. Such means comprises a lever 56 movable between the arms 16 of the transferrer 14 and provided at its outer end with a pivoted presser foot 58 in the channeled end surface of which is an insert 60 composed of rubber or other soft and yielding material. Upon downward movement of the presser foot 58 the label A is directly engaged by the rubber insert 60 which contacts with the central portion of the label substantially in the center line of the article support 10. The presser foot 58 is maintained in the position shown in Fig. 12 during the initial portion of the upward movement of the transferrer arms 16, so that upon upward movement of said arms, the ends of the label A are disengaged therefrom.

Figure 6:
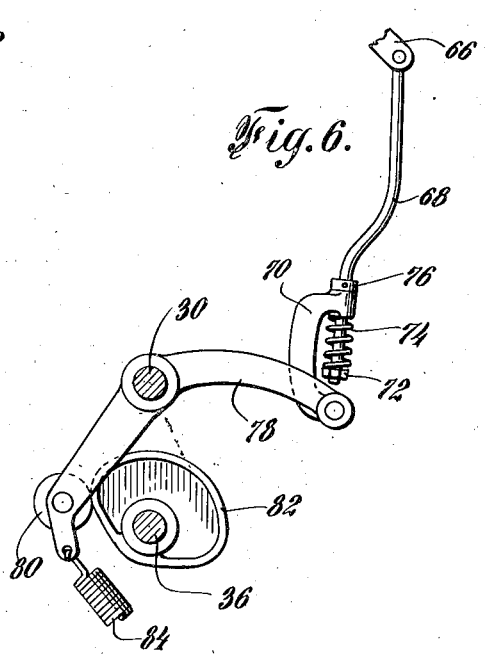
Fig. 6 is a like view of the means for operating the presser foot.

The lever 56 which carries the presser foot 58 is fulcrumed at 62 to the upper end of a bowed bracket 64 extending inwardly and upwardly from the front side of the machine frame 2, and said lever is provided forwardly of its fulcrum 62 with a downward extension 66 joined to the upper end of an operating rod 68. The rod 68 (Fig. 6) passes loosely through an eye at the upper end of a yoke 70, and is provided below its connection with the yoke 70 with a nut 72 and a compression spring 74 interposed between the yoke 70 and the nut 72 and operating to maintain the yoke normally against a collar 76 fast on the rod 68. The yoke 70 is connected at its lower end with a cam lever 78 also mounted on the transverse shaft 30 and provided with a roller 80 riding on the periphery of a cam 82 on the main cam shaft 36. The roller 80 on the lever 78 is urged against the cam 82 by a spring 84 connected to the outer end of the lever 78 and to the transverse rod 40. The yielding operating connection provided by the yoke 70 and compression spring 74 adapts the presser foot 58 for operation on articles of varying sizes by enabling the presser foot to yield as required by the conditions of the work.

The transferrer 14 not only transfers the labels to a position enabling them to be applied to the articles, but also applies to the ends of the labels an adhesive by which the labels are permanently fixed to the articles. In order to enable the transferrer 14 to perform such functions a suitable adhesive is applied to the surfaces 18 of the transferrer arms 16 during each cycle of their movement. To this end the frame 2 of the machine is provided with tracks or guides 86 fixedly secured thereto and inclined upwardly and forwardly from the top of the frame below the label container 4, and a roller 88 is mounted for movement on said tracks into and out of engagement with the label engaging surfaces 18 of the transferrer arms. As shown, the roller 88 is journaled in arms 90 depending pivotally from blocks 92 slidable on the tracks 86, and the arms 90 are connected by springs 94 to the outer ends of rearward projections 96 on the blocks 92.

The adhesive applied to the labels A is contained in a pot or container 98 stationarily supported on a platform 99 in the upper part of the machine frame 2, and having journaled therein a roller 100. The roller 100 is driven from a gear 102 on the main cam shaft 36 by means of a chain 104, as shown diagrammatically in Fig. 2, and passing over a gear 106 in line with the shaft of the roller 100 and a tightener 108 on the frame 2. The shaft of the roller 100 is provided with a gear 110 (Fig. 2) arranged in register with a gear 112 on the shaft of the roller 88. The gear 106 (Fig. 4) transmits rotation to the gear 110 and roller 100 through the medium of lugs 113 on said gears. This construction causes the roller 88 to be rotated when it is brought back to its rearmost position into engagement with the roller 100, the proper meshing of the gears 110 and 112 being insured by the yielding connection provided by the springs 94 between the roller 88 and its carrying blocks 92 and by the loose driving connection to the roller 100 provided by the lugs 113.

Figure 2:
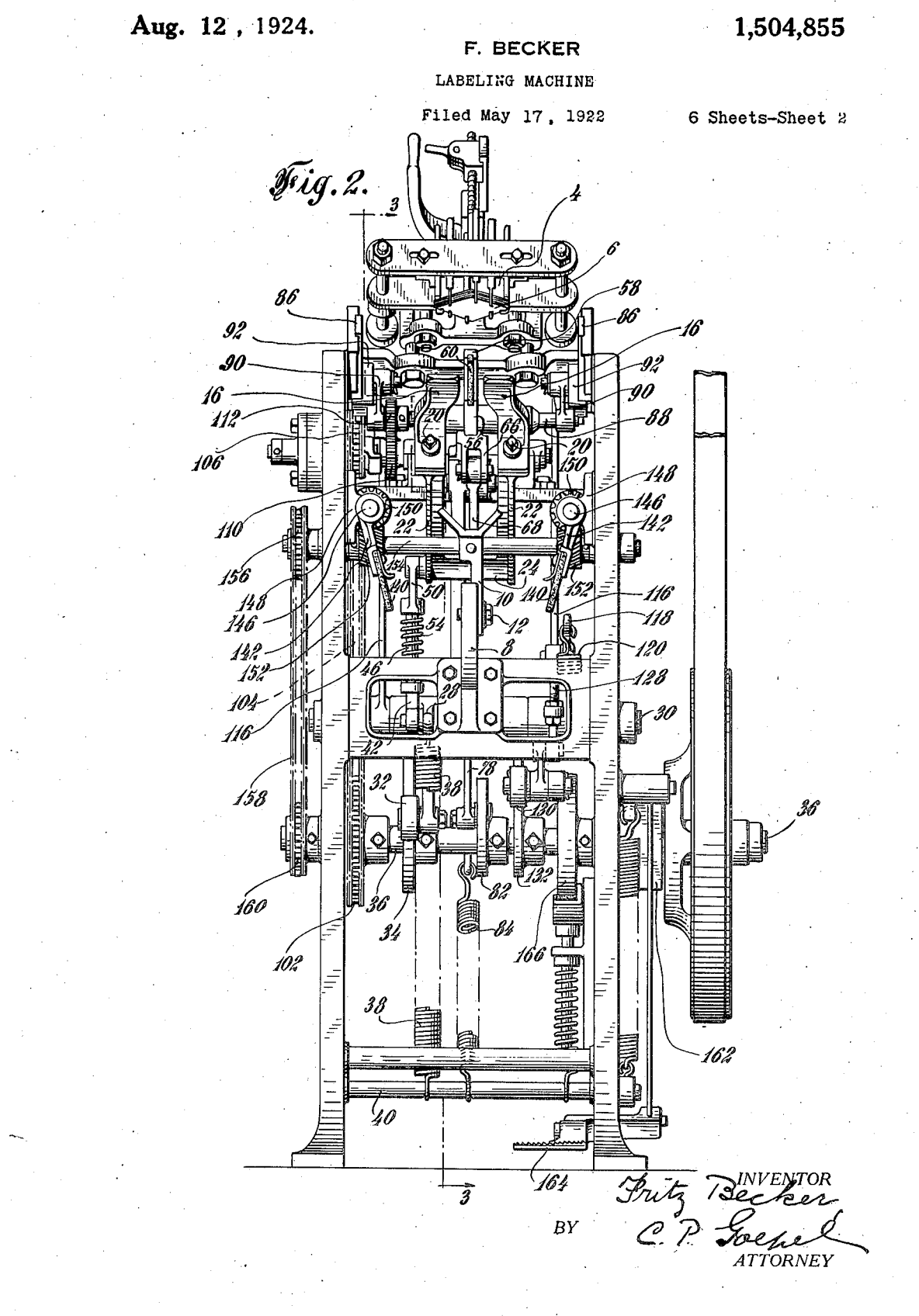
Figure 7:
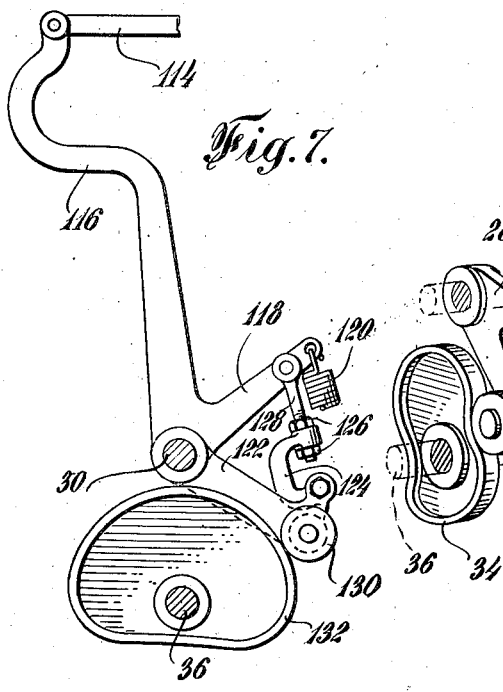
Fig. 7 is a like view of the means for reciprocating the roller by which adhesive is applied to the label engaging surfaces of the transferrer arms.
Figure 8:
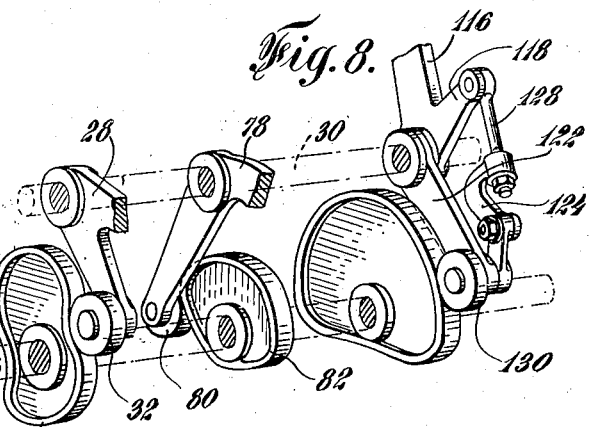
Fig. 8 is a detail view of the main cam shaft of the machine and the parts directly associated with it.

The blocks 92 are reciprocated on the tracks 86 to bring the roller 88 into engagement with the roller 100 and the surfaces 18 of the transferrer arms 16 during each cycle of operations of the machine by means including links 114 pivotally connected to the blocks 92 at one of their ends and at their other ends to the rearwardly bowed upper ends of levers 116 fixed on the transverse shaft 30. The lever 116 at the right of the machine, as seen in Fig. 2, is formed at its lower end with an upwardly and forwardly inclined arm 118 connected by a spring 120 (Fig. 7) to the transverse rod 40. A link 122 is loosely mounted on the rod 30 adjacent to the lever 116 and is connected to the arm 118 of the lever 116 by a yoke 124 pivoted at its lower end to an upward extension on the link 122 and secured at its upper end by nuts 126 to the lower end of an eye rod 128, the upper end of which is fulcrumed to the arm 118 of the lever 116. The arm 122 is provided at its outer end with a roller 130 arranged for riding engagement with a cam 132 on the main cam shaft 36. The described connection between the link 122 and the levers 116 causes the levers to be operated in accordance with the operation of the link 122 and enables the range of movement of the levers 116 and the resultant extent of the reciprocations of the blocks 92 and the roller 88 carried thereby to be varied, as desired, by turning the nuts 126 upwardly or downwardly on the rod 128. The construction of the transferrer arms 16 whereby their label engaging surfaces 18 are offset upwardly from the rear portions of the arms enables the roller 88 to engage the surface 18 without coming into contact with the arms rearwardly of such surfaces, thus causing the adhesive to be applied to the transferrer arms only at the portions where needed.

After a label A has been disengaged from the transferrer arms 16 by the elevation of the transferrer arms therefrom, it is engaged by wipers 140 which set the label in permanently affixed relation to the article. The wipers 140 are composed of any suitable soft and flexible material and are arranged to engage a label A on opposite sides of and closely adjacent to the insert 60 of the presser foot 58 and to wipe outwardly off the ends of the labels. The wipers 140 are arranged to engage a label simultaneously and to exert substantially equal pressure thereon so as to cause it to be set smoothly upon the article without distortion or wrinkling. The wipers 140 are carried by arms 142 to which they are secured by attaching plates 144, the arms 142 being in turn fixed upon shafts 146 mounted in bearings 148 on the machine frame 2 for continuous rotation in opposite directions, as indicated by the arrows in Fig. 14. The shafts 146 are provided at their rear ends with spiral gears 150 meshing with similarly shaped gears 152 on a shaft 154 mounted transversely in the machine frame. The shaft 154 is provided at one end with a gear 156 to which rotation is imparted by a drive chain 158 from a gear 160 on the main shaft 36.

The machine is governed in its operations by clutch mechanism 162 controlled by a foot lever 164, and brake mechanism is provided for causing the machine to stop with the parts in the positions shown in Fig. 9. As herein shown this mechanism includes a wheel 166 fixed upon the shaft 36 and engaged by the brake shoe 167 on the upper end of a rod 168 which is movable through suitable guides on the machine frame, said rod being yieldingly urged upwardly to hold the shoe in braking engagement with the wheel 166 by means of a spring 170. The clutch mechanism 162 may be of usual construction and does not require further description.

The manner of operation of the illustrated machine will now be described. Assuming that the parts are in the positions shown in Fig. 9, upon the initiation of the operation of the machine, the transferrer arms 16 are moved upwardly to cause their surfaces 18 to be pressed against the underside of the lower label in the container 4. At the same time, the lever 56 and presser foot 58 are swung upwardly and rearwardly away from the label engaging surfaces 18 of the arms 16. Meanwhile the roller 88 is retained in engagement with the roller 100, the parts being then in the positions shown in Fig. 10. In the continued operation of the machine, the transferrer arms 16 are swung downwardly carrying with them a label A from the container 4 to a position adjacent to the top surface of the article B on the article support 10. The lever 56 and presser foot 58 are swung downwardly with the transferrer arms 16, and the rubber insert 60 in the presser foot is thereby moved into engagement with the label centrally of the space between the transferrer arms 16 and substantially in the center line of the article support 10. The rubber inset 60 of the presser foot 58 is moved downwardly to a somewhat greater extent than the transferrer arms 16, and locates the central portion of the label A on the article B to be labeled, as shown in Figs. 11 and 12. It will be apparent also from Figs. 11 and 12 that during the downward movement of the transferrer arms 16 and the presser foot 58, the roller 88 for applying adhesive to the surfaces 18 of the transferrer arms is moved away from the roller 100 on the tracks 86, and the wipers 140 attain substantially to the uppermost points of their movement. The transferrer arms 16 are then moved upwardly simultaneously with the continued outward movement of the roller 88 to bring the surfaces 18 of the transferrer arms into engagement with said roller so as to cause the roller to apply adhesive to such surfaces, as shown in Fig. 13. Meanwhile the wipers 140 in their continued rotation are brought into engagement with the label A on the opposite sides of the presser foot 58 which has remained in engagement with the label A, as indicated in Fig. 14. The wipers 140 then press the ends of the label A which are coated with adhesive from the surfaces 18 of the transferrer arms 16 smoothly against the article B, the presser foot 58 and the rubber insert 60 being engaged with the label while the wipers 140 remain in engagement with it so as to avoid all possibility of disarranging the label. As the lever 56 is moved upwardly, the roller 88 is withdrawn rearwardly into engagement with the roller 100, and the wipers 140 rotate downwardly off the ends of the label, thus bringing the parts into the positions shown in Fig. 15 and completing a cycle of operations of the machine. The machine then either stops or continues upon a second cycle of operations, according as to whether the operator has or has not removed his foot from the treadle 164.

In the form of the invention shown in Fig. 16 the article support 10' is constructed to adapt the machine for affixing labels to a bottle or other article B' of rectangular transverse section. To this end the article support 10 is formed in its upper surface with a longitudinal channel 176 bounded by lugs or ribs 178 extending upwardly from the lateral edges of the support. As shown in Fig. 16, the label A' is of a length greater than the width of the top wall of the article B', so that the tip ends of the label extend beyond the edges of the top wall of the article. In this form of the invention, the wipers 140' are of somewhat greater thickness and stiffness than the wipers 140 hereinbefore described, and are formed at their free ends with outwardly turned noses 180, the points of which are arranged to wipe along the portions of the labels A' upon the top wall of the article B' and to engage the tip ends of the label A' and press them closely against the vertical walls of the article B' adjacent to the top wall. The attaching plates 144 for the wipers 140' preferably extend somewhat beyond the ends of the arms 142 and are rounded, as indicated at 182 in Fig. 16. The projecting, rounded end portions 182 of the attaching plates 144 provide a backing for the wipers 140' which enables them to exert sufficient pressure on the tip ends of the labels to cause them to engage closely with the vertical walls of the articles B'.

It will be understood from the foregoing that whatever the form of the wipers may be, the continuous rotation of each of the wipers in the same direction, as distinguished from a machine in which oscillating wipers are employed, insures that the wipers will always pass off from the tip ends of the labels so as to set them closely upon the article and obviates all possibility of breaking or disarranging the ends of the labels, as sometimes happens upon the return movements of wipers of the oscillating type. The construction, manner of operation, and the several advantages of the invention will be clearly understood from the preceding description.

Having fully described the invention, what is claimed is:

1. In a labeling machine, pivotally mounted carrier arms to position a label upon the article to be labeled, a presser foot pivotally supported for movement in a plane parallel with the label carrying arms about an axis disposed in parallel relation to the axis of said label carrying arms, said presser foot adapted to engage the intermediate portion of the label and hold the same upon the article during a reverse movement of said arms to disengage the same from the label, a power shaft, spaced cams fixed on said shaft, operating means for the label carrying arms actuated by one of said cams, and operating means for the presser foot actuated by the other of said cams, said latter means including a resiliently yieldable connection permitting of the engagement of the presser foot with articles of different sizes.

2. In a labeling machine, cam operated means for locating labels upon the articles to be labeled, wipers for setting the labels upon the articles, and spiral gears for rotating each of the wipers continuously in the same direction.

3. In a labeling machine, a pivotally mounted lever, a presser foot pivoted upon one end of said lever to hold a label upon the article to be labeled, an operating cam, a lever fulcrumed intermediate of its ends carrying a roller for engagement with said cam, an actuating rod connected to said first named lever, and a yieldable connection between said rod and the second named lever whereby said presser foot may be operatively engaged with articles of various sizes.

4. In a labeling machine adapted to apply labels to articles of angular transverse section and of less width than the length of the labels, means for locating a label against one side of an article, and wipers for setting the labels upon the articles, said wipers being formed with offset portions adapted to engage and press the tip ends of the labels against the sides of the article adjacent to the first-mentioned side.

In testimony that I claim the foregoing as my invention, I have signed my name.

FRITZ BECKER.